June 14, 1927.
A. G. ATCHISON
1,632,690
CAMERA ATTACHMENT
Filed Oct. 4, 1926
4 Sheets-Sheet 2
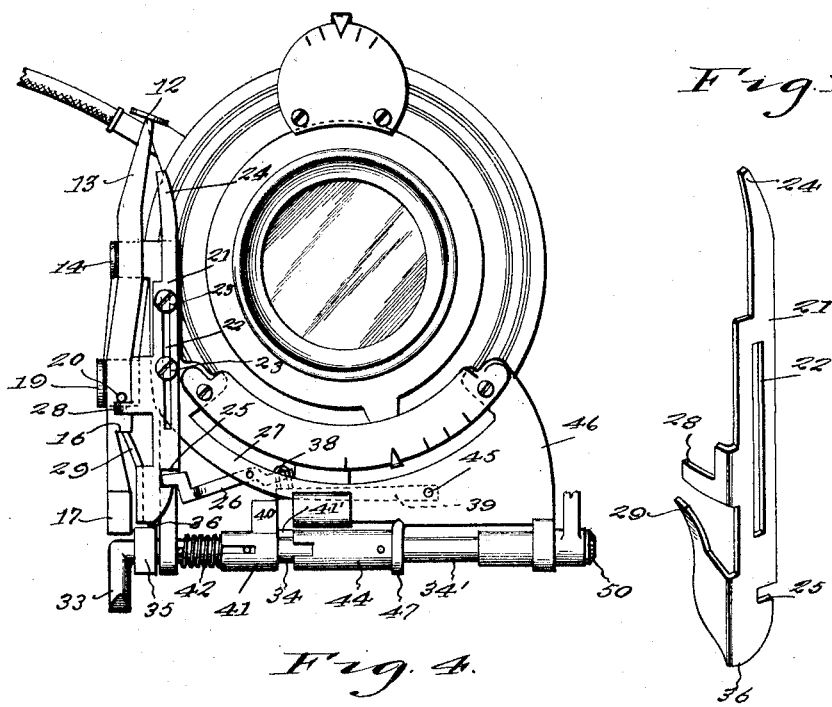
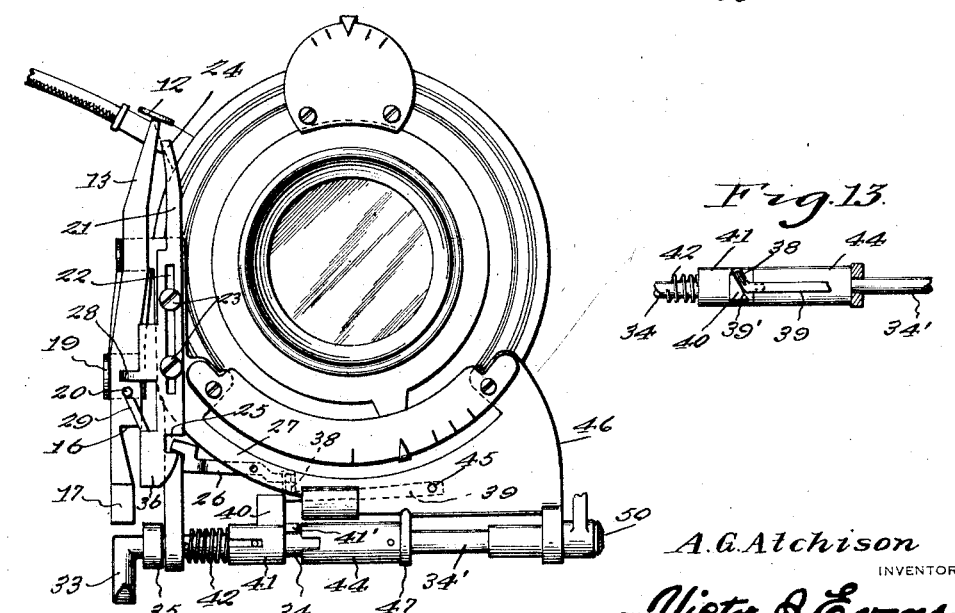
A. G. Atchison
INVENTOR
BY Victor J. Evans
ATTORNEY
R. A. Thomas
WITNESS:

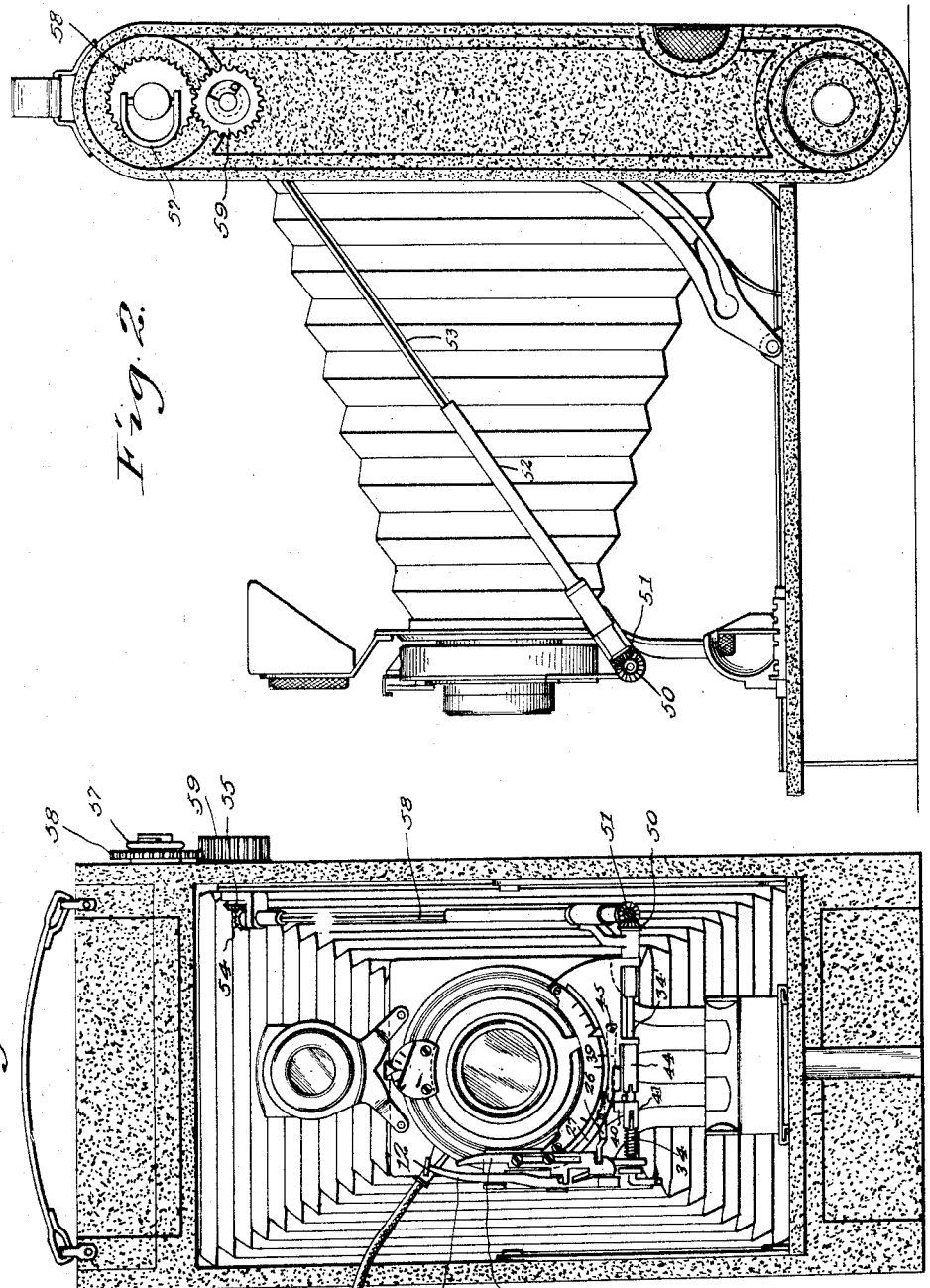

June 14, 1927.
A. G. ATCHISON
1,632,690
CAMERA ATTACHMENT
Filed Oct. 4, 1926
4 Sheets-Sheet 3
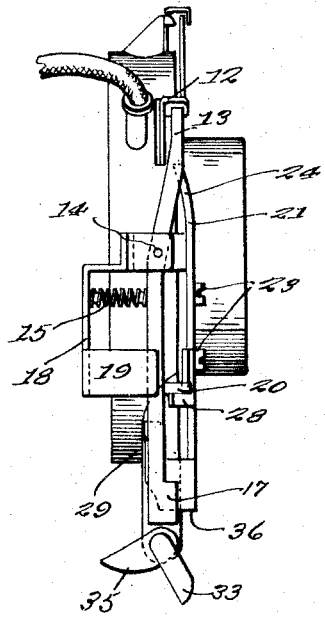
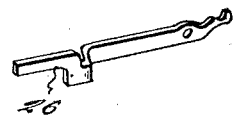
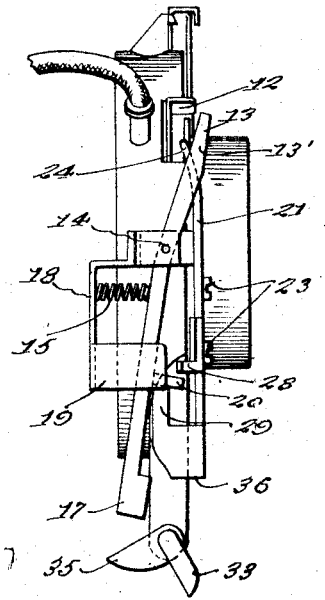
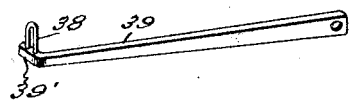
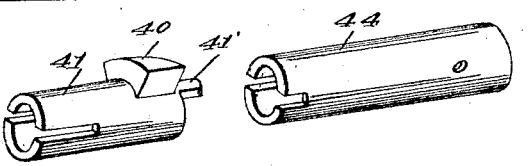
A. G. Atchison
INVENTOR
BY Victor J. Evans
ATTORNEY

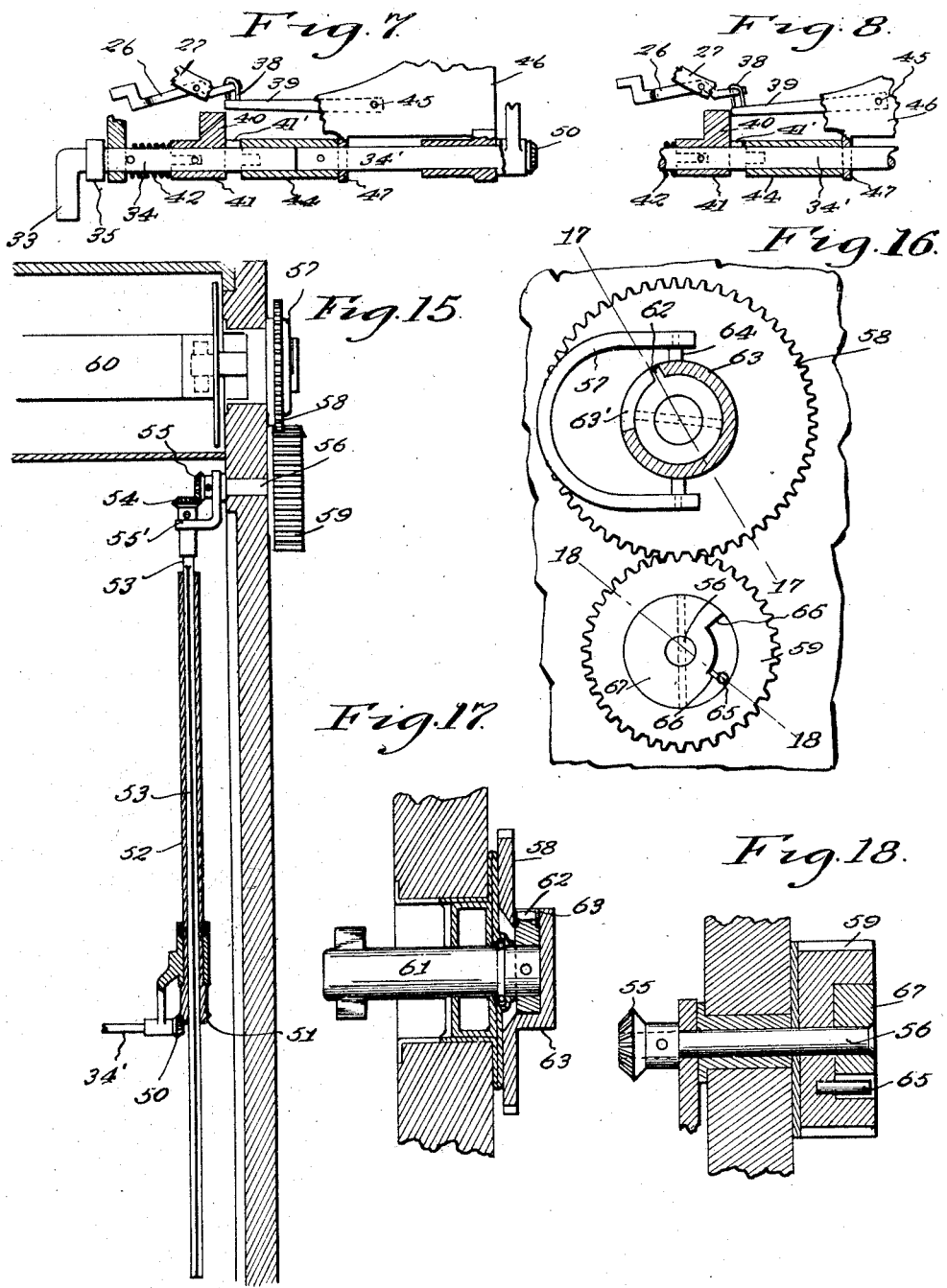

Patented June 14, 1927.

1,632,690

UNITED STATES PATENT OFFICE.

ARLO GRANT ATCHISON, OF SANTA BARBARA, CALIFORNIA.

CAMERA ATTACHMENT.

Application filed October 4, 1926. Serial No. 139,467.

The object of this invention is to provide means for preventing double exposure, by employing a particular type of mechanism making it necessary to advance the film after each exposure, the operation of the shutter in making an exposure acting to throw a pivoted retaining device into the path of movement of an element of the shutter control, this retaining device being released only by operating the film shifting mechanism.

A further object is to provide, in connection with the retaining device, a vertically slidable element having a particular relation to the pivoted retaining device and the film winding means and being under the joint control of the latter and the shutter mechanism.

With the foregoing and other objects in view, the invention consists in the novel construction and arrangement of elements described, illustrated and claimed, it being understood that modifications may be made within the scope of the claims without departing from the spirit of the invention.

In the drawings forming part of this application,

Figure 1 is a view in front elevation, showing a camera with my attachment applied thereto.

Figure 2 is a view in side elevation.

Figure 3 is an elevation of the attachment, on a larger scale, the position with reference to the lens mounting means being illustrated, and the locking means being in position for preventing exposure.

Figure 4 is a similar view, the elements being in position permitting exposure.

Figure 5 shows the mechanism of Figures 3 and 4, in elevation, from another angle.

Figure 6 is a view in elevation, showing the elements of Figure 5, with the locking device in release position.

Figure 7 is a detail view in longitudinal section of the clutch at the lower part of Figures 3 and 4.

Figure 8 shows a portion of the structure of Figure 7, with the parts in another position.

Figure 9 is a detail view in perspective of one of the pivoted elements referred to below.

Figure 10 is a perspective view of another of these elements.

Figures 11 and 12 show elements of the clutch, in perspective, and plan.

Figure 13 is a further detail view.

Figure 14 is a perspective view of the vertically slidable element of Figures 3 and 4, this element being movable downwardly by one of the elements of the shutter mechanism, when an exposure is made, and cooperating with the other elements in the manner indicated below.

Figure 15 shows the gearing of the film winding or shifting means, and a shaft controlled thereby and adapted for operative connection with the other elements of the attachment.

Figure 16 is a view of the gearing at the upper portion of Figure 15, from another angle.

Figure 17 is a section on line 17—17 of Figure 16.

Figure 18 is a section on line 18—18 of Figure 16.

At the left of Figure 1 the element 10 for controlling the shutter is of the usual type, and the arm 12 operating at the same time, is illustrated in Figure 1, and is further shown in Figures 3, 4, 5 and 6. The locking means to be described cooperates directly with this arm 12, and a pivoted finger 13 is movable to a position under the upper offset end of element 12, for effecting the locking operation. This finger 13 is pivoted at 14, and an expansion spring 15, tends to throw the finger to the position of Figure 5, and it will be observed that the finger 13 is provided with a shoulder formed at 16, for cooperation with an element referred to below. The finger 13 also carries at its lower end an offset portion forming a shoulder at 17, the element 13 being guided between the members of a bracket 18, one of these guiding members being shown at 19, and a pin 20 projects from finger 13, in the position shown, and for the purpose specified below.

A vertically slidable arm or bar 21, illustrated in perspective in Figure 14, includes a central vertical slot 22 thru which the screws 23 pass, the latter retaining and guiding the bar 21. This bar has a curved upper end 24, and is movable to the position of Figure 4, wherein it is in the path of the downward movement of arm 12, so that when finger 13 is in release position, as shown in Figure 6, the end 24 of bar 21 is engaged by arm 12, and moves downwardly when the element 10 is pressed for opening the shutter of the camera, at which time arm 12 operates, (unless locked by finger 13 as shown in Figure 3).

Bar 21 which includes the upper curved end 24, also includes a lower notched portion 25 engaged by one end of pivoted arm 26, of the form shown in Figure 9, this element being mounted on a stationary element 27, as shown in Figures 7 and 8. The bar 21 further includes the offset portion 28, extending in the direction shown especially in Figure 14, and includes the deflected finger 29 adapted for engaging the shoulder 16, in the manner illustrated in Figure 3, offset portion 28 cooperating with the pin 20. In Figures 4 and 6, prior to the opening of the shutter, offset or lug 28 of bar 21 is above pin 20 on finger 13, but upon opening the shutter the arm 12 engages the surface 13' of finger 13, and this portion of said finger is moved outwardly, and pin 20 moves rearwardly with reference to lug 28, and is freed therefrom, so that lug 28 of bar 21 moving downwardly, passes pin 20 and assumes the position of Figures 3 and 5.

The tilting of finger 13 also frees or releases shoulder 16 from the element 29 of bar 21, and the latter moving downwardly throws pivoted arm 26 from the position of Figure 4 to the position of Figure 3.

A crank arm 33 on shaft 34 is adapted to engage the end 17 of finger 13, incident to the film shifting operation, referred to below, and throw the lower end of finger 13 rearwardly, and the upper end to the position of Figure 6, so that after changing the position of the film strip, the locking device 13 is released from arm 12.

Cam 35 of Figure 6 and elsewhere is at an angle of approximately 90 degrees with reference to crank arm 33, and this cam engages the lower end 36 of bar 21, and elevates the latter to the position of Figure 4, after the film is in position for taking a new exposure.

When bar 21 has moved downwardly, because of the opening of the shutter, the pivoted arm 26 engaging the loop or eye member 38 of bar or arm 39, pivoted at one end as shown in Figure 7 and elsewhere, releases element 39 and especially the offset end 39', from locking engagement with cam 40 projecting from the slidable clutch element 41, and the latter is movable toward the right, under the action of spring 42, and into locking engagement with clutch element 44, fixed on shaft 34'. The clutch elements, free before the shutter is opened, are in engagement after the shutter has closed, because of the downward movement of bar 21, and the operation of pivoted arm 26, producing the result indicated in Figures 7 and 8, so far as the lifting of arm 39 is concerned. In these views, arm 39 is shown as being pivoted at 45 on a stationary member 46, and a portion of the latter is downwardly deflected, and is apertured to provide a bearing at 47 for shaft 34'.

Shaft 34' is rotated, when the film is shifted to a new position, and at the close of the shifting operation, the cam 40 engages the end 39' of arm 39, and the clutch element 41 with its engaging tooth 41', is released from fixed clutch element 44,—said clutch element 41 then sliding on shaft 34, toward the left, and placing spring 42 under compression.

Shaft 34 having been rotated in this operation, and bar 21 elevated by cam 35, arm 26 moves downwardly, at the right hand end thereof, and arm 39 drops from the dotted line position of Figure 3 to the position of Figure 4, the end 39' holding cam 40 and clutch element 41 in release position, so far as fixed clutch element 44 is concerned, so that further rotation of shaft 34' does not affect shaft 34, one end of which enters the clutch element or sleeve 44. (The elements at the left of Figures 3 and 4, controlled by cams 33 and 35, are movable by the latter only when shaft 34 is rotated.)

Shaft 34' by which shaft 34 in alinement therewith is rotated, when the clutch elements 41 and 44 are in engagement,—carries a pinion or gear wheel 50 meshing with pinion or wheel 51 and tubular shaft 52, having a square bore, engaged by relatively slidable square shaft 53. The latter has fixed with reference thereto a gear wheel 54 meshing with gear wheel 55, the latter being fixed on short shaft 56, rotated by the mechanism of Figures 15 and 16, also shown in part, in Figures 1 and 2.

Upon shifting the film, for a new exposure, by the rotation of handle 57, gear wheels 58 and 59 impart rotation to shaft 56, and therefore rotate shaft 34', so that if the clutch elements 41 and 44 are in engagement, as provided for by the making of a previous exposure, shaft 34 will be rotated, bar 21 and its upper end 24 will be thrown to the position of Figure 4, and finger 13, which had previously locked arm 12 of the shutter mechanism, is released, permitting a new exposure.

A spool 60 is rotated by spindle 61, slidable outwardly for disengaging the spool, and the spindle carries lug 62 engaged by the hub portion 63 of wheel 58, the hub and wheel being rotated by handle 57, thru radially extending elements 64. Lug 62 projects thru a segmental slot 63' in hub 63, and there is limited play between the ends of slot 63' and lug 62.

Gear wheel 58 engages or meshes with gear wheel 59, when the spindle 61 is in its inner position, as in Figure 15, and the gear wheel 59 carries a pin or lug 65 adapted to engage a shoulder 66 on disk 67, for rotating the latter and imparting rotation to shaft 56 on which it is fixed. The element last named rotates the relatively slidable shafts of Figure 15, and Figures 1 and 2, for controlling the special mechanism forming an important feature of the present application.

When opening and closing the camera, shaft 53 moves angularly with reference to the axis defined by shaft 56, and the latter is rotated slightly thru elements 54, 55, but the pin and slot arrangement of Figure 16 permits this slight rotation of shaft 56, and the opening and closing movement, without moving the film roller, owing to the provision for lost motion.

Having described the invention what is claimed is:—

1. In a device of the class described, a shutter arm, a pivoted finger movable under said arm to prevent operation of the latter, a slidable bar operated by the arm when the finger is in release position, film shifting means, a shaft rotated by said means, a second shaft and means thereon for releasing the finger, clutch elements for operating the second shaft from that first named, means retaining one element of the clutch out of engagement with the other, an arm operated by the slidable bar and throwing out the clutch retaining means, finger engaging means controlled by the bar, and means for moving the finger when free to operate, into the path of the shutter arm for locking the latter.

2. In a device of the class described, a shutter arm, a pivoted finger movable under said arm to prevent operation of the latter, a slidable bar operated by the arm when the finger is in release position, film shifting means, a shaft rotated by said means, a second shaft and devices thereon for releasing the finger and restoring the bar after the operation of the shutter arm, clutch elements for operating the second shaft from that first named, means retaining one element of the clutch out of engagement with the other, an arm operated by the slidable bar and throwing out the clutch retaining means, finger engaging means controlled by the bar, and means for moving the finger when free to operate, into the path of the shutter arm for locking the latter.

3. In a device of the class described, a shutter arm, a pivoted finger movable under said arm to prevent operation of the latter, a slidable bar operated by the arm when the finger is in release position, film shifting means, a shaft rotated by said means, a second shaft and means thereon for releasing the finger, clutch elements for operating the second shaft from that first named, means retaining one element of the clutch out of engagement with the other, an arm operated by the slidable bar and throwing out the clutch retaining means, finger engaging means controlled by the bar, and means for moving the finger when free to operate, into the path of the shutter arm for locking the latter, and means for throwing out the clutch automatically by the film shifting means.

4. In a device of the class described, a shutter arm, a pivoted finger movable under said arm to prevent operation of the latter, a slidable bar operated by the arm when the finger is in release position, film shifting means, a shaft rotated by said means, a second shaft and devices thereon constituting cam elements thrown to operative position successively for releasing the finger and restoring the bar after the operation of the shutter arm, clutch elements for operating the second shaft from that first named, means retaining one element of the clutch out of engagement with the other, an arm operated by the slidable bar and throwing out the clutch retaining means, finger engaging means controlled by the bar, and means for moving the finger when free to operate, into the path of the shutter arm for locking the latter.

5. In a device of the class described, a shutter arm, a pivoted locking finger movable into the path of the arm, a slidable bar moved longitudinally by the arm, engaging devices on the finger and bar, film shifting means, and mechanism operated by the shifting means for releasing the engaging devices between the bar and finger and moving the bar into the path of the shutter arm after shifting the film.

6. In a device of the class described, a shutter arm, a pivoted locking finger movable into the path of the arm, a slidable bar moved longitudinally by the arm, engaging devices on the finger and bar, film shifting means, and mechanism operated by the shifting means for releasing the engaging devices between the bar and finger and moving the bar into the path of the shutter arm after shifting the film, and devices automatically rendering said mechanism inoperative prior to further exposure of the film and the operation of the arm first named.

In testimony whereof I affix my signature.

ARLO GRANT ATCHISON.